US012526860B2

(12) United States Patent
Paczkowski et al.

(10) Patent No.: US 12,526,860 B2
(45) Date of Patent: Jan. 13, 2026

(54) MOBILITY EDGE NETWORK SYSTEMS AND METHODS

(71) Applicant: T-MOBILE INNOVATIONS LLC, Overland Park, KS (US)

(72) Inventors: Lyle Walter Paczkowski, Mission Hills, KS (US); Marouane Balmakhtar, Fairfax, VA (US); Galip Murat Karabulut, Vienna, VA (US); Mark Richard Bales, Lee's Summit, MO (US); Robert Keith Butler, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 517 days.

(21) Appl. No.: 18/149,538

(22) Filed: Jan. 3, 2023

(65) Prior Publication Data

US 2024/0224352 A1 Jul. 4, 2024

(51) Int. Cl.
*H04W 76/14* (2018.01)
*H04W 48/14* (2009.01)
*H04W 84/06* (2009.01)

(52) U.S. Cl.
CPC .......... *H04W 76/14* (2018.02); *H04W 48/14* (2013.01); *H04W 84/06* (2013.01)

(58) Field of Classification Search
CPC .............. H04L 41/044; H04L 41/0806; H04L 41/0895; H04L 41/122; H04L 41/342; H04L 41/40; H04L 41/5051; H04W 28/0268; H04W 28/086; H04W 48/14; H04W 76/14; H04W 84/005; H04W 84/06

See application file for complete search history.

(56) References Cited

U.S. PATENT DOCUMENTS

| | | | |
|---|---|---|---|
| 2020/0053546 A1* | 2/2020 | Panchal | H04W 72/543 |
| 2021/0266834 A1* | 8/2021 | Hu | H04W 4/46 |
| 2022/0150809 A1* | 5/2022 | Guo | H04W 8/24 |
| 2022/0159501 A1* | 5/2022 | Chou | H04L 41/122 |
| 2023/0171824 A1* | 6/2023 | Purkayastha | H04W 76/14 370/310 |
| 2024/0015569 A1* | 1/2024 | Doostnejad | H04L 47/24 |
| 2024/0056920 A1* | 2/2024 | Ciochina | H04W 4/029 |

* cited by examiner

*Primary Examiner* — Awet Haile
(74) *Attorney, Agent, or Firm* — Shook, Hardy & Bacon L.L.P.

(57) ABSTRACT

Mobility edge network systems and methods are provided. In some embodiments, a mobility edge interface extends instantiation of a UPF and/or other network functions of the operator core network further from the traditional centralized network core, to a new edge that is launched and hosted at the UE level. The mobility edge interface may implement a mobility UPF instance that is launched by one or more applications executed on a primary UE and made accessible through a wireless communication link with a mobility edge RAN established by the primary UE. Through the mobility edge RAN and the mobility UPF instance, a secondary UE may establish a point-to-point wireless communication link (which may be a 3GPP link, or a non-3GPP link) and a user plane data path with the primary UE, in order to communicate data corresponding to a data session between the primary and secondary UE.

20 Claims, 9 Drawing Sheets

MOBILITY EDGE NETWORK SYSTEMS AND METHODS

BACKGROUND

In the field of automated and remote controlled vehicles, there is a growing interest in using telecommunications networks, and particularly 3rd Generation Partnership Project (3GPP) $5^{th}$ Generation (5G) technologies, to carry command and control instructions. For example, 5G technologies are enabling long range control of commercial and consumer drones beyond the visual line of sight (VLOS) paradigm. The drones, and the controller devices that operate them, are able to leverage characteristic of modern telecommunications networks, such as a well-established infrastructure, extended communications range, low latency, and high reliability. For example, by sending commands from a control device to a drone using a 5G telecommunications network, the drone can quickly receive and respond to commands from the controller device, and benefit from native 5G signal quality, security, and signal strength management technologies, reducing margins of error in controlling the drone due to signal loss, interference, and/or latency.

SUMMARY

The present disclosure is directed, in part to mobility edge network systems and methods, substantially as shown and/or described in connection with at least one of the Figures, and as set forth more completely in the claims.

One or more of the embodiments presented in the disclosure provide for, among other things mobility edge network systems and methods. More specifically, one or more of the embodiments herein disclose a mobility edge interface (MEI) that extends instantiation of a UPF instance and/or other network functions of the operator core network further from one or more central core data centers, to a new edge that is launched and hosted at the UE level. The mobility edge interface implements a mobility UPF instance that is launched by one or more applications executed on a UE (referred to herein as a primary UE) and made accessible through a mobility edge RAN established by the primary UE. Through the mobility edge RAN and mobility UPF instance, another UE (referred to herein as a secondary UE) may establish a point-to-point wireless communication link (which may be a 3GPP link, or a non-3GPP link) and user plane data path with the primary UE, in order to communicate data corresponding to a data session between the primary and secondary UEs. Authorization for UE usage of the mobility UPF instance may still be controlled by one or more network functions of the network operator core. But application(s) executed on one or both of the primary and secondary UEs may control data channel characteristics of the data path, such as, but not limited to, bandwidth, data rate, quality of service parameters, uplink and/or downlink RF signal power, and/or other parameters. As such, the user data channel established via the mobility edge instance may be managed in real time locally at the UE level based on factors directly influencing the quality of RF communications between the two UE, and not factors that may be influencing the overall flow of data traffic through the network RAN(s) and/or operator core network (such a network congestion and/or service interruptions due to network equipment degradations, for example).

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
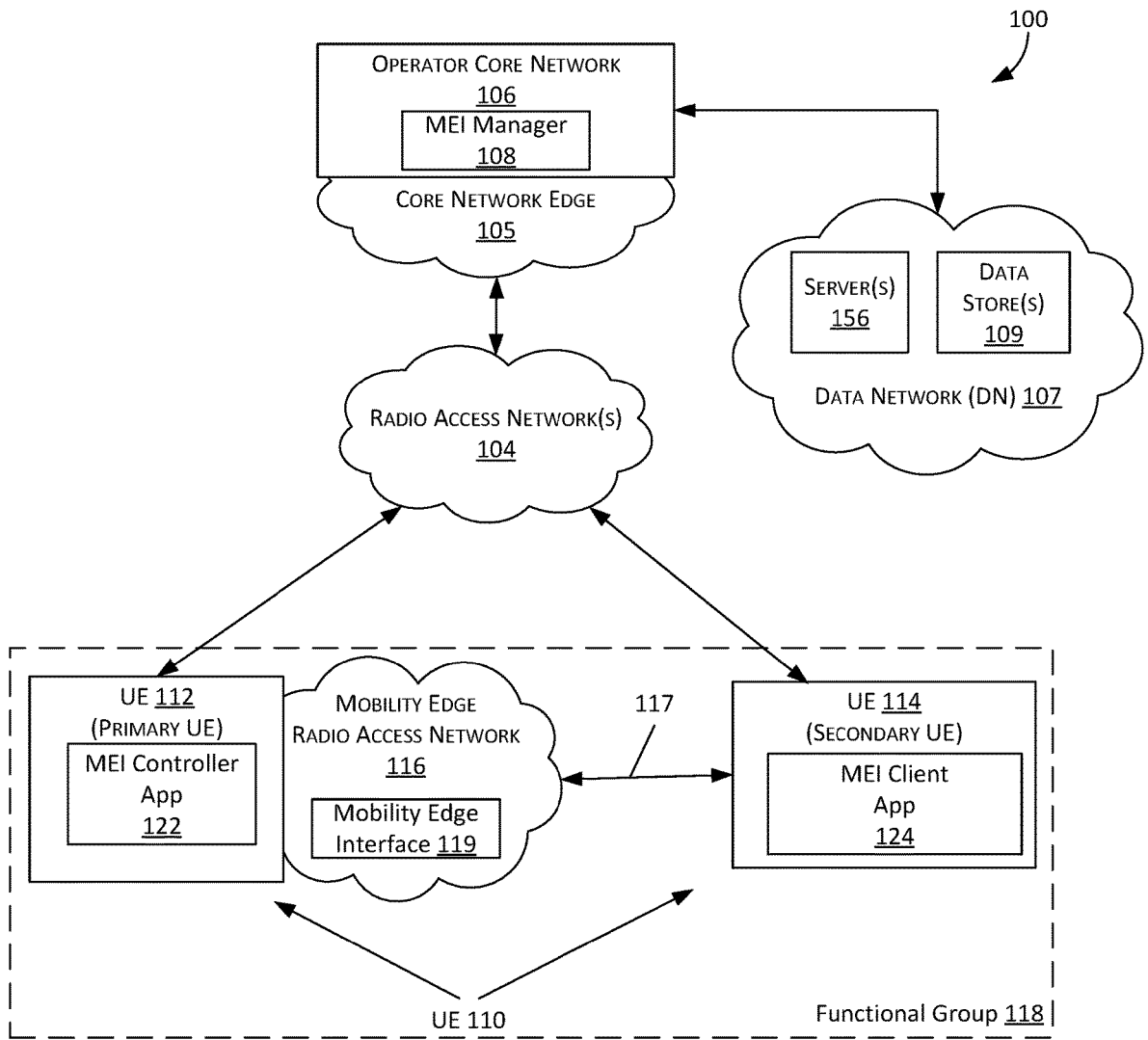
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments presented in the disclosure provide for, among other things, mobility edge network systems and methods. 5G technologies enable long range control of commercial and consumer drones (e.g., aerial drones) beyond the visual line of sight (VLOS) paradigm. The drones, and the controller devices that operate them, are able to leverage characteristics of modern telecommunications networks, such as a well-established infrastructure, extended communications range, low latency, and high reliability. By sending commands from a control device to a drone using a 5G telecommunications network, the drone can quickly receive and respond to commands from the controller device, and benefit from native 5G signal quality, security and strength technologies, reducing margins of error due to signal loss, interference, and/or latency. In such applications, the controller and the aerial drone are both operating on the telecommunications network as user equipment (UE) devices that are individually granted access to use the telecommunications network. Each UE is able to access network services provided by the telecommunications network, including the ability to establish a user plane data session between the respective UE through the infrastructure of the telecommunications network. Through that data session, the controller may send, for example, command and control messages to the drone, and the drone may send, for example, telemetry and captured data (such as image data) to the controller. More specifically, the controller device, as a UE, may establish a communications link with a radio access network (RAN), and through that RAN register with the operator core network of the telecommunications network. Similarly, the drone, as a UE, may establish a communications link with a RAN (which may, or may not, be the same RAN used by the controller device), and through that RAN register with the operator core network of the telecommunications network. Moreover, the user data for the data session carried by wireless signals is protected by encryption in both the uplink (UL) and downlink (DL) direction for both the controller device and the drone. Data transmitted in the uplink direction from the controller device may be transmitted through a RAN to a user plane function (UPF) of the operator core network, transported by the UPF to the RAN connected to the drone device, and transmitted in the downlink direction to the drone. Data transmitted in the uplink direction from the drone may be transmitted through its RAN to the user plane function (UPF) of the operator core network, transported by the UPF to the RAN connected to the controller device, and transmitted in the downlink direction to the controller device. As such, the operator core network is in control of the wireless communications link to each of the controller device and the drone (e.g., through one or more control plane and/or signaling channels) and manages the transport of user data between them through an operator core network user plane function. In this way, a low latency, reliable, and high-quality communications links transports user data between the controller device and the drone.

However, there are emerging applications where the controller device and the drone may be operating together within a close vicinity, rather than at an extended distance from each other. For example, a drone may operate as a delivery vehicle with a task of delivering a package to a delivery truck. In such an example, the delivery truck may comprise an embedded controller device. The controller device of the delivery truck may use the telecommunications network to send a message to communicate its location to the drone. The drone may use the telecommunications network to communicate an acknowledgement location to the drone and periodically send messages updating its own locations and/or distance from the delivery truck, and/or provide an estimated time till arrival at the delivery truck. As another example, a drone may operate as a look-ahead scout for a vehicle (such as an emergency vehicle, for example). In this example, the controller device of the vehicle may use the telecommunications network to send a message to communicate its location and/or a planned route through city streets to a destination. The drone may use the telecommunications network to communicate traffic congestion information back to the vehicle, which the vehicle may use to re-route its path. As another example, a drone may operate as an inspection tool for inspecting otherwise hard to reach equipment or facilities, such as power lines in a power line corridor. In such an embodiment, a utility truck may comprise the controller device. The controller device of the utility truck may use the telecommunications network to send a message to communicate navigation instructions to pilot the drone to locations to capture data, such as images, for example. The drone may use the telecommunications network to send captured inspection data back to the vehicle. In each of these example scenarios, the controller device and the drone benefit from the low latency, reliable, and high-quality telecommunications network communications links to maintain uninterrupted precision control of the drone.

That said, as disclosed herein, there is room for improvement with respect to further improving latency and reliability, and other parameters, of the data path communicating user data between the controller and the drone using edge computing. More specifically, one or more of the embodiments herein disclose a mobility edge interface (MEI) that extends instantiation of a UPF instance and/or other network functions of the operator core network further from one or more of core data centers, to a new edge that is launched and hosted at the UE level. The mobility edge interface implements a mobility UPF instance that is launched by one or more applications executed on a UE (referred to herein as a primary UE) and made accessible through a wireless communication link with the mobility edge RAN established by the primary UE. Through the mobility edge RAN and mobility UPF instance, another UE (referred to herein as a secondary UE) may establish a point-to-point wireless communication link (which may be a 3GPP link, or a non-3GPP link) and user plane data path with the primary UE, in order to communicate data corresponding to a data session between the primary and secondary UE. Authorization for the secondary UE's usage of the mobility UPF instance may still be controlled by one or more network functions of the network operator core. But application(s) executed on one or both of the primary and secondary UEs may control data channel characteristics of the data path, such as, but not limited to, bandwidth, data rate, quality of service parameters, uplink and/or downlink RF signal power, and/or other parameters. As such, the user data channel established via the mobility edge instance may be managed in real time locally at the UE level based on factors directly influencing the quality of RF communications between the two UE, and not factors that may be influencing the overall flow of data traffic through the network RAN(s) and/or operator core network (such a network congestion and/or service interruptions due to network equipment degradations, for example). Latency between the primary UE and the secondary UE is further reduced as communications between the two UE do not need to be transported up and back from the operator core network. Moreover, substantial overhead is avoided at the operator core network level, as processing and network resources for encrypting uplink and downlink traffic and transporting the user data, are substantially avoided.

In some embodiments, in order to manage the establishment and use of a mobility edge instance and authorize the primary UE to establish a mobility UPF instance, or to authorize a secondary UE to use a mobility UPF instance established by a primary UE, the operator core network may include a mobility edge interface (MEI) manager network function. The MEI manager may evaluate a request message sent from a UE to establish a mobility edge instance, and grant that request upon confirming that the primary and secondary UE are subscribed to mobility edge services offered by the operator core network. The MEI manager may then grant authorization to a MEI controller application executing on a primary UE to function as a network element of the operator core network. The MEI manager may further grant the MEI controller application authorization to establish the mobility edge RAN, and implement a data path via a mobility UPF instance that functions as a fully authorized UPF of the operator core network. In some embodiments, the MEI controller application may be an individual application or process executed by the primary UE that implements the mobility edge related functionality discussed herein. In other embodiments, the MEI controller application may be integrated with other functionalities executed on the UE. For example, the MEI controller application may be implemented as a module of the UE operating system. In other embodiments, the MEI controller application may be integrated as a component within another application that utilizes mobility edge functionalities. For example, in the scenario of the primary UE functioning as the controller for a drone secondary UE, the primary UE may execute a drone controller application (e.g., a Ground Control System (GCS)) where the functionalities of MEI controller application are integrated in that drone controller application. The data path through the mobility edge RAN may thus be accessed by the secondary UE so that the mobility UPF instance can be used to transport user data for the data session between the primary UE and the secondary UE (for example, a data session between an application executing on the primary UE and an application executing on the secondary UE). In some embodiments, the MEI manager may further communicate a key or other authentication credentials to an MEI client application on the secondary UE that grant the secondary UE with access to the mobility UPF instance. In this way, access to the mobility UPF instance can be controlled and may be limited to carrying user data for a data session between the primary UE and the secondary UE, and limited unauthorized UE from access the mobility edge interface. In some embodiments, while the primary and secondary UEs communicate user data for their data session through using the mobility edge interface, they may maintain a primary connection (e.g. through a RAN) with the operator core network for other data session traffic. In some embodiments, the MEI client application may be an individual application or process executed by the secondary UE that implements the mobility edge related functionality discussed herein. In other embodiments, the MEI client application may be integrated with other functionalities executed on the UE. For example, the MEI client application may be implemented as a module of the UE operating system. In other embodiments, the MEI client application may be integrated as a component within another application that utilizes mobility edge functionalities. For example, in the scenario of the primary UE functioning as the controller for a drone secondary UE, the secondary UE 112 may execute a drone responder application (e.g., an application that control the drone based on commands from a Ground Control System (GCS)) where the functionalities of MEI client application are integrated in that drone responder application.

As an example, in some embodiments, a pair of UEs may include a controller device UE and an aerial drone UE. In this example, the controller device is described as functioning as the primary device while the aerial drone is functioning as the secondary device. However, it should be understood that in other embodiments this arrangement may be swapped so that the aerial drone is described as functioning as the primary device while the controller device is functioning as the secondary device. In one implementation, the controller device and the aerial drone may each be coupled to the telecommunications network. In this example, the aerial drone is assigned a task to deliver a package to a vehicle comprising the controller device. The aerial drone may initiate an initial contact with the controller device via the telecommunications network to perform a handshake to obtain coordinates of a rendezvous point. The MEI controller application may send at least one request message to the MEI manager network function in the operator core network, requesting to establish the mobility edge interface with mobility UPF instance, and the mobility edge RAN. The request message may further include the UE identifier (ID), or other identifier(s), of the drone. The MEI manager network function verifies from subscription information that the controller device and drone are both authorized for mobility edge services, and sends and authorization message to the MEI controller application, which may include one or more IDs, codes, and/or credential that the MEI controller application uses to create the mobility edge interface and mobility UPF instance. The MEI manager may further communicate to the drone a key or other credential to the MEI client application on the drone, that the MEI client application may use to access the mobility edge interface and mobility UPF instance. When the drone reaches a proximity within the RF coverage area of the mobility edge RAN, it may connect to the mobility edge RAN and mobility UPF instance using the credentials provided by the MEI manager. A network function of the operator core network (such as the core access and mobility management function (AMF) and/or session management function (SMF), for example) may then configure the MEI controller application and MEI client application to route traffic for one or more data sessions between those UE through the mobility UPF instance rather than through a UPF established within the operator core network. In some embodiments, the MEI manager, MEI controller application and/or the MEI client application may be implemented using trusted applications (e.g., trustlets executed within trusted processing environments).

It should be understood that while this disclosure discusses example use case scenario where the UE comprise a vehicle and an aerial drone establishing a data session through a wireless communication link with a mobility edge interface to operate together in some fashion as a functional team, these examples are not to be taken as limiting. In other embodiments, mobility edge services of the operator core networks may be used to establish a mobility edge interface and mobility UPF instance to facilitate a mobility edge point-to-point user plane data path between any types of UE.

FIG. 1 is a diagram illustrating an example network environment 100 embodiment for a wireless communication system. Network environment 100 is but one example of a suitable network environment for providing mobility edge services and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises an operator core network 106 (also referred to as a "core network") that provides one or more network services to one or more UE 110 within a coverage area of at least one radio access network (RAN) 104. In some embodiments, network environment 100 comprises, at least in part, a wireless communications network.

The RAN 104 may comprise a radio access network (RAN) equipment, often referred to as a cellular base station. The RAN 104 may be referred to as a gNodeB in the context of a 5G New Radio (NR) implementation, or other terminology depending on the specific implementation technology. In some embodiments, the RAN 104 may comprise in part components of a customer premises network, such as a distributed antenna system (DAS) for example. In some embodiments, RAN 104 may comprise a multi-modal network (for example comprising one or more multi-modal access devices) where multiple radios supporting different systems are integrated into the radio RAN 104. Such a multi-modal RAN 104 may support a combination of 3GPP radio technologies (e.g., 4G, 5G and/or 6G) and/or non-3GPP radio technologies. In some embodiment, the RAN 104 may comprise a terrestrial wireless communications base station and/or may be at least in part implemented as a space-based access network (e.g., comprising an Earth orbiting space-based wireless communications base station).

In particular, individual UE 110 may communicate with the operator core network 106 via the RAN 104 over one or both of uplink (UL) RF signals and downlink (DL) RF signals. The RAN 104 may be coupled to the operator core network 106 via a core network edge 105 that comprises wired and/or wireless network connections that may themselves include wireless relays and/or repeaters. In some embodiments, the RAN 104 is coupled to the operator core network 106 at least in part by a backhaul network such as the Internet or other public or private network infrastructure. The core network edge 105 may comprise one or more network nodes or other elements of the operator core network 106 that may define the boundary of the operator core network 106 and may serve as the architectural demarcation point where the operator core network 106 connects to other networks such as, but not limited to RAN 104, the Internet, or other third-party networks. It should be understood that in some aspects, the network environment 100 may not comprise a distinct network operator core 106, but rather may implement one or more features of the network operator core 106 within other portions of the network, or may not implement them at all, depending on various carrier preferences.

In the embodiment of FIG. 1, UE 110 are depicted as members of a controller-responder based functional group 118. Within the context of the functional group 118, the UE 110 may assume different roles in furtherance of performing a task or service that the functional group 118 is to accomplish. In some embodiments, a UE 110 may function as a primary UE 112. As explained in greater detailed below, a primary UE 112 is a UE 110 that it authorized by the operator core network to locally launch (e.g., generate) instances of one or more functions of the operator core network 106. The functional group 118 may further include another UE 110 that functions a secondary UE 114 and contributes to the task or service performed by the functional group 118. In some embodiments, the primary UE 112 may establish, on an ad-hoc basis, a mobility edge RAN 116 together with one or more of the network functions of the operator core network 106. For example, as further discussed with respect to FIGS. 2A and 2B, the primary UE 112 is authorized to instantiate (e.g., launch) a mobility edge interface 119 of the operator core network 106 that hosts at least a mobility UPF instance, which may be utilized by UE 110 of the functional group 118 to communicate user plane data between the primary UE 112 and secondary UE 114. Although FIG. 1 illustrates a mobile function team 118 comprising a single secondary UE 114, it should be understood that in some embodiments, the primary UE 112 may create an ad-hoc mobility edge RAN 116 that supports communications between the primary UE 112 and one or more secondary UE 114, and/or user plane communications between multiple secondary UE 114 of the functional group 118.

As an example implementation, in one embodiment, a primary UE 112 may comprise a vehicle (such as an emergency vehicle) and a secondary UE 114 may comprise an aerial pilot drone. In this example, the primary UE 112 and the secondary UE 114 form a functional group 118 where the secondary UE 114 services as a look-ahead pilot for the primary UE 112 along a path through traffic to a target destination. In operation, the primary UE 112 may issue a request for aerial pilot drone navigation assistance (e.g., from a server 156 that may comprise a drone dispatch server) which dispatches the secondary UE 114 to meet with the primary UE 112 at a rendezvous location. When the secondary UE 114 becomes within a predetermined proximity of the primary UE 112, the functional group 118 may be established. The primary UE 112 may activate the mobility edge RAN 116 that provides access to the mobility edge interface 119 that include a mobility UPF instance authorized by the operator core network 106. The secondary UE 114 may establish one or more radio communication links 117 with the primary UE 112 via the mobility edge RAN 116 so that user plane traffic for data sessions between the primary UE 112 and the secondary UE 114 is carried by the mobility edge interface 119. For example, the vehicle may communicate its current location (e.g., determined using a global navigation satellite system receiver) and a planned route through the streets of a city center to the aerial pilot drone. The aerial pilot drone may fly ahead of the vehicle on the route while capturing images of traffic, traffic flow data, and/or other data, and communicating that real-time information back to the vehicle. If the vehicle re-routes its path, the new path may be communicated to the aerial pilot drone. The transport of the user data traffic is communicated using the mobility edge RAN 116 through the mobility UPF instance, rather than up-and-back through the RAN 104 and operator core network 106.

As discussed below with respect to FIGS. 2A and 2B, the radio communication links 117 may comprise 3GPP and/or non-3GPP based radio communications links, and/or multi-modal communications comprising a combination of 3GPP and non-3GPP radio communications links. Without the radio communication links 117, communicating user plane data between the primary UE 112 and the secondary UE 114 would involve first communicating the data from a sending UE 110 to the RAN(s) 104, through the operator core network 106, back to the RAN(s) 104 and then to the receiving UE 110. In contrast to this hair-pin traffic path, the radio communication links 117 can carry user plane data using point-to-point communications between the primary UE 112 and the secondary UE 114. Latency and reliability factors in this example are both improved because user plan traffic avoids having to perform multiple network hops, and there are fewer intervening network devices that could otherwise potentially degrade to slow or disrupt traffic flow. In some embodiments, the user plane traffic carried by the radio communication links 117 is user data for data sessions established between the primary UE 112 and the secondary UE 114. Other data sessions, such as PDU sessions between the primary UE 112 or secondary UE 114 and a server 156, are still carried via the operator core network 106 through radio communication links between the respective UE and the RAN 104. Because the mobility edge RAN 116 creates a mobility edge interface that is effectively an extension of the operator core network 106, security and other network functions of the operator core network 106 may be applied to user plane data session traffic carried between the primary UE 112 and the secondary UE 114.

In order to manage the establishment and control of the mobility edge interface 119 made available through the mobility edge RAN 116, the operator core network 106 may comprise a mobile edge interface (MEI) manager 108 network function. The MEI manager 108 may coordinate with an MEI controller application 122 executed by the primary UE 112, and/or an MEI client application 124 executed by the secondary UE 114, to implement the mobility edge RAN 116 and mobility edge interface 119. In some embodiments, MEI manager 108 may control the establishment and use of a mobility edge instance 119. For example, the MEI manager 108 may authorize the MEI controller application 122 to establish a mobility edge instance 119 comprising a mobility UPF instance. The MEI manager 108 may authorize the MEI client application 124 use the mobility UPF instance established by the primary UE 112. The MEI manger 108 may evaluate a request from the primary UE 112 to establish the mobility edge instance 119, and grant that request upon confirming that the primary UE 112 and secondary UE 114 are subscribed to mobility edge services offered by the operator core network 106. The MEI manager 106 may then grant authorization to a MEI controller application 112 executing on the primary UE 112 to essentially function as a network element agent of the operator core network 108. The MEI manager 108 may further grant the MEI controller application 112 authorization to establish the mobility edge RAN 116, and implement a data path via the mobility UPF instance that functions as a fully authorized UPF of the operator core network. The operator core network 106 may then configure the MEI controller application 122 and MEI client application 124 to route traffic for one or more data sessions between those UEs through the mobility UPF instance of the mobility edge interface 119 rather than through a UPF established within the operator core network 106. In some embodiments, the MEI controller application 122 and MEI client application 124 may each establish an internal gateway to the mobility edge interface 119 that routes user data for data sessions between the primary UE 112 and secondary UE 114 through the mobility edge interface 119 while other traffic is passed to the RAN(s) 104.

In some embodiments, the MEI manager 108 may further communicate a key or other authentication credentials to the MEI client application 124 that grants the secondary UE 114 access to the mobility UPF instance of the mobility edge instance 119. In this way, access to the mobility UPF instance can be controlled and limited to carrying user data for a data session between the primary UE 112 and the secondary UE 114, and limit unauthorized UEs from accessing the mobility edge interface 119. The data path through the mobility edge RAN 116 may thus be accessed by the secondary UE 114 so that the mobility UPF instance can be used to transport user data for the data session between the primary UE 112 and the secondary UE 114. Because the MEI controller application 122 is operating under the authority of the operator core network 106, it may inherit from, or otherwise be assigned by, the operator core network 106 one or more network identifiers, key sets, and/or other authentication elements, that the secondary UE 114 is programmed to recognize as valid. For example, when the MEI manager 108 provides credentials to the MEI client application 124, it may also provide network identifiers, key sets, and/or other authentication elements for recognizing the correct mobility edge RAN 116.

As shown in FIG. 1, network environment 100 may also comprise at least one data network (DN) 107 coupled to the operator core network 106 (e.g., via the network edge 105). Data network 107 may include one or more data stores 109 and one or more servers 156 that provide content and/or services to the UE 110. Generally, an individual UE 110 may comprise a device capable of unidirectional or bidirectional communication with the RAN 104 via wireless and/or wired communication links. The network environment 100 may be configured for wirelessly connecting UEs 110 to other UEs 110 via the same RAN 104, via other access networks, via other telecommunication networks, and/or to connect UEs to a publicly-switched telecommunication network (PSTN). The network environment 100 may be generally configured for wirelessly connecting a UE 110 to data or services that may be accessible on one or more application servers or other functions, nodes, or servers. The operating environment 100 may be generally configured, in some embodiments, for wirelessly connecting UE 110 to data or services that may be accessible on one or more application servers or other functions, nodes, or servers (such as services provided by servers of data network 107).

UE 110 may in general, comprise forms of equipment and machines such as but, not limited to, Internet-of-Things (IOT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 110 may include both mobile UE and stationary UE. The UE 110 can include one or more processors, and one or more non-transient computer-readable media for executing code to carry out the functions of the UE 110 described herein. The computer-readable media may include computer-readable instructions executable by the one or more processors. In some embodiments, the UE 110 may be implemented using a computing device 700 as discussed below with respect to FIG. 7.

Figure 2A:
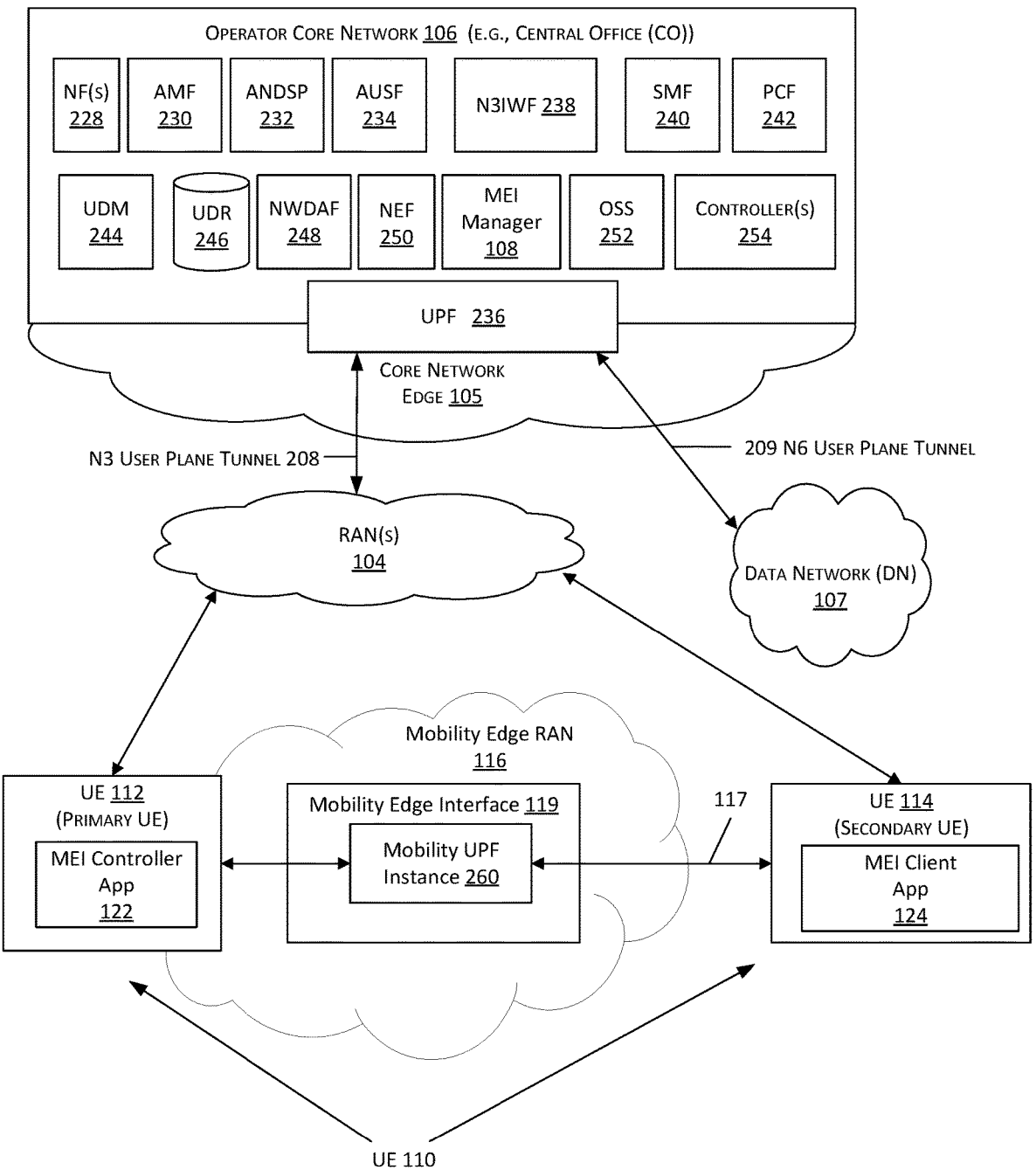
FIG. 2A is a diagram illustrating an example implementation of an operator core network for a networking environment, in accordance with some embodiments described herein.
Figure 2B:
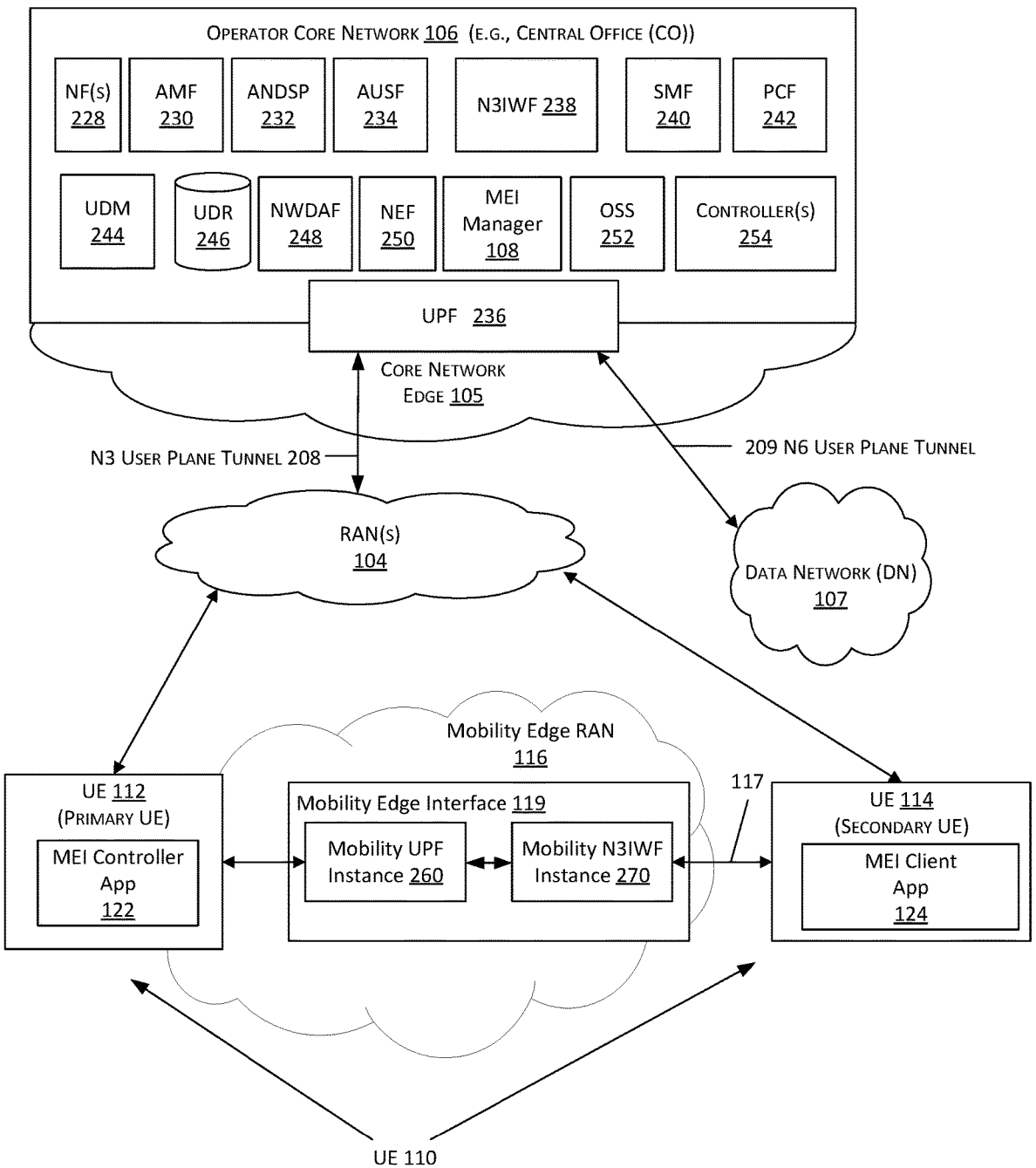
FIG. 2B is a diagram illustrating an example implementation of an operator core network for a networking environment, in accordance with some embodiments described herein.

Referring now to FIGS. 2A and 2B, these figures illustrate example implementations of the networking environment 100 of FIG. 1. In some implementations, the operator core network 106 may comprise modules, also referred to as network functions (NFs), generally represented in FIGS. 2A and 2B as NF(s) 228. Such network functions may include, but are not limited to, one or more of a core access and mobility management function (AMF) 230, an access network discovery and selection policy (ANDSP) 232, an authentication server function (AUSF) 234, a user plane function (UPF) 236, non-3GPP Interworking Function (N3IWF) 238, a session management function (SMF) 240, a policy control function (PCF) 242, unified data management (UDM) 244, an unified data repository (UDR) 246, Network Data Analytics Function (NWDAF) 248, a network exposure function (NEF) 250, and an operations support system (OSS) 252. As discussed with respect to FIG. 1, the MEI manager 108 may be implemented as a network function of the operator core network 106. In some embodiments, the functions of the MEI manager 108 described herein may be performed at least in part by one or more of the other network functions of the operator core network 106. Implementation of these NFs of the operator core network 106 may be executed by one or more controllers 254 on which these network functions are orchestrated or otherwise configured to execute utilizing processors and memory of the one or more controllers 254. The NFs may be implemented as physical and/or virtual network functions, container network functions, and/or cloud-native network functions.

Notably, nomenclature used herein is used with respect to the 3GPP 5G architecture. In other aspects, one or more of the network functions of the operator core network 106 may take different forms, including consolidated or distributed forms that perform the same general operations. For example, the AMF 230 in the 3GPP 5G architecture is configured for various functions relating to security and access management and authorization, including registration management, connection management, paging, and mobility management; in other forms, such as a 4G architecture, the AMF 230 of FIGS. 2A and 2B may take the form of a mobility management entity (MME). The operator core network 106 may be generally said to authorize rights to and facilitate access to an application server/service such as provided by application function(s) requested by any of the UE 110. In some embodiments, the at least one data network (DN) 107 may be coupled to the operator core network 106, for example via the network edge 105.

As shown in FIGS. 2A and 2B, a UPF 236 represents at least one function of the operator core network 106 that may extend into the core network edge 105. In some embodiments, the RAN 104 is coupled to the UPF 236 within the core network edge 105 by a communication link that includes an N3 user plane tunnel 208. For example, the N3 user plane tunnel 208 may connect a cell site router of the RAN 104 to an N3 interface of the UPF 236. The data network 107 may be coupled to the UPF 236 in the core network edge 105 by a N6 user plane tunnel 209. For example, the N6 user plane tunnel 209 may connect a network interface (e.g., a switch, router and/or gateway) of the DN 107 to an N6 interface of the UPF 236. In some embodiments, the operator core network 106 may comprise a plurality of UPFs 236. For example, the network may comprise a UPF at the operator core network 106 and a UPF at the core network edge 105. For example a UPF at the core network edge 105 may be used for local break out and/or low latency types of application via an N9 interface between the two UPFs. As further discussed below, the mobility edge interface 119 may include a mobility UPF instance 260 which functions as a specialized version of a UPF of the operator core network 106 in that it temporarily establishes a user plane data path to carry data session user data between the primary UE 112 and secondary UE 114 outside of the operator core network 106 and core network edge 105, but otherwise functions as a UPF in the same manner as UPF 236.

The AMF 230 facilitates mobility management, registration management, and connection management for 3GPP devices such as a UE 110. ANDSP 232 facilitates mobility management, registration management, and connection management for non-3GPP devices. AUSF 234 may receive authentication requests from the AMF 230 and interacts with UDM 244, for example, for SIM authentication and/or to authenticate a UE 110 based on another device ID. N3IWF 238 provides a secure gateway for non-3GPP network access, which may be used for providing connections for UE 110 access to the operator core network 106 over a non-3GPP access network. SMF module 240 facilitates initial creation of protocol data unit (PDU) sessions using session establishment procedures. The PCF 242 maintains and applies policy control decisions and subscription information. Additionally, in some aspects, the PCF 242 maintains quality of service (QOS) policy rules. For example, the QoS rules stored in a unified data repository (UDR) 246 can identify a set of access permissions, resource allocations, or any other QoS policy established by an operator. In some embodiments, the PCF 242 maintains subscription information indicating one or more services and/or micro-services subscribed to by each UE 110. Such subscription information may include subscription information pertaining to a subscription for access to services of the MEI manager 108.

The UDM 244 manages network user data including, but not limited to, data storage management, subscription management, policy control, and core network 106 exposure. NWDAF 248 collects data (for example, from UE, other network functions, application functions and operations, administration, and maintenance (OAM) systems) that can be used for network data analytics. The OSS 252 is responsible for the management and orchestration of the operator core network 106, and the various physical, virtual network functions, container network functions, controllers, compute nodes, and other elements that implement the operator core network 106.

Some aspects of operating environment 100 include the UDR 246 storing information relating to access control and service and/or micro-service subscriptions. The UDR 246 may be configured to store information relating to such subscriber information and may be accessible by multiple different NFs in order to perform desirable functions. For example, the UDR 246 may be accessed by the AMF 230 in order to determine subscriber information pertaining the UE 110, accessed by a PCF 242 to obtain policy related data and/or accessed by NEF 250 to obtain data that is permitted for exposure to third party applications. Other functions of the NEF 250 include monitoring of UE related events and posting information about those events for use by external entities, and providing an interface for provisioning UEs (via PCF 242) and reporting provisioning events to the UDR 246. Although depicted as a unified data management module, UDR 246 can be implemented as a plurality of network function (NF) specific data management modules.

The UPF 236 is generally configured to facilitate user plane operation relating to packet routing and forwarding, interconnection to a data network (e.g., DN 107), policy enforcement, and data buffering, among other operations. Using network slicing (e.g., using 5G software-defined networking (SDN) and/or 5G network slice selection function (NSSF)), the UPF 236 may establish a dedicated network slice for one or more data channels of the UE 110 that act as, in essence, as a distinct network (for example, establishing its own QoS, provisioning, and/or security) within the same physical network architecture of the core network edge 105. For example, in different implementations, a UE 110 may be assigned a network slick such as an Enhanced Mobile Broadband (eMBB) 5G network slice, a Massive Machine Type Communications (MMTC) 5G network slice, an Ultra-Reliable Low Latency Communication (URLLC) 5G network slice, or a Public Safety (PS) 5G network slice. In some embodiments, the mobility UPF instance 260 may perform one or more of the same functions as the UPF 236 within the context of the mobility edge interface 119 which may be specifically implemented to carry user data for one or more data sessions between the primary UE 112 and the secondary UE 114 in a point-to-point configuration rather than through the operator core network 106 or core network edger 105. That said, in some embodiments, the MEI manager 108 may implement an N9 interface tunnel between the UPF 236 and the mobility UPF instance 260 (e.g., via either primary UE 112 and/or secondary UE 114 communication links with the RAN(s) 104).

As shown in these FIGS., the primary UE 112 establishes the mobility edge RAN 116 providing access for the secondary UE 114 to the mobility edge interface 119.

In the implementation of FIG. 2A, when the secondary UE 114 joins the mobility edge RAN 116, it does so as a trusted 3GPP UE using 3GPP protocols to join the mobility edge RAN 116 and connect a data path to the mobility UPF instance 260, for example, in the same way that it may connect to the UPF 236 via the RAN(s) 104. The mobility edge RAN 116 may use different 3GPP channels than used by the RAN(s) 104 in order avoid interfering with operation of the RAN(s) 104. In some embodiments, the mobility edge RAN 116 may dynamically reconfigure the 3GPP channels it uses in order avoid interfering with operation of the RAN(s) 104.

In such an embodiment, the MEI manager 108 may communicate with the AMF 230 to configure the MEI controller application 122 and/or MEI client application 124 to route traffic for one or more data sessions between the primary UE 112 and the secondary UE 114 through the mobility UPF instance 260 rather than through the UPF 236. In some embodiments, the primary UE 112 and the secondary UE 114 each may maintain their respective registration and authorization with the operator core network 106 and one or both may continue to communicate with the operator core network via the RAN(s) 104 with respect to communicating control plane data and/or user plane data for other data sessions not carried by the mobility UPF instance 260 (for example, for PDU sessions with a data store 109 and/or server 156 of data network 107).

In the implementation of FIG. 2B, when the secondary UE 114 joins the mobility edge RAN 116, it does so as a non-3GPP UE. For example, the mobility edge RAN 116 may be configured to operate as a Wi-Fi access point, or other wireless technology access point, rather than a 3GPP RAN as is the case in FIG. 2A. In such an embodiment, the MEI controller application 122 may further (with authorization of the MEI manager 108) execute software to implement a mobility N3IWF instance 270, that has a data path coupled to the mobility UPF instance 260. The mobility N3IWF instance 270 includes the same functionality as the N3IWF 238 but instead functions in conjunction with the mobility UPF instance 260. That is, the mobility N3IWF instance 270 is a network function that provides a secure gateway for non-3GPP network access to the mobility edge interface 119, which may be used for providing connections for secondary UE 114 with access to the mobility UPF instance 260 over the mobility edge RAN 116 when the mobility edge RAN 116 is operating as a non-3GPP access network. In such an embodiment, the MEI manager 108 may communicate with the SMF 240 to configure the MEI controller application 122 and/or MEI client application 124 to route traffic for one or more data sessions between the primary UE 112 and the secondary UE 114 through the mobility UPF instance 260 and mobility N3IWF instance 270 rather than through the UPF 236 and N3IWF 238. In some embodiments, the mobility N3IWF instance 270 may interact with the AMF 230 in the operator core network 106 to establish a session N3 interface between the secondary UE 114 and the mobility UPF instance 260 on the primary UE 112. In some embodiments, the interactions between the mobility N3IWF instance 270 and the AMF 230 may be conducted using the MEI manager 108. In some embodiments, the primary UE 112 and the secondary UE 114 each may maintain their respective registration and authorization with the operator core network 106 and one or both may continue to communicate with the operator core network via the RAN(s) 104 with respect to communicating control plane data and/or user plane data for other data sessions not carried by the mobility UPF instance 260 (for example, for PDU sessions with a data store 109 and/or server 156 of data network 107).

Figure 3:
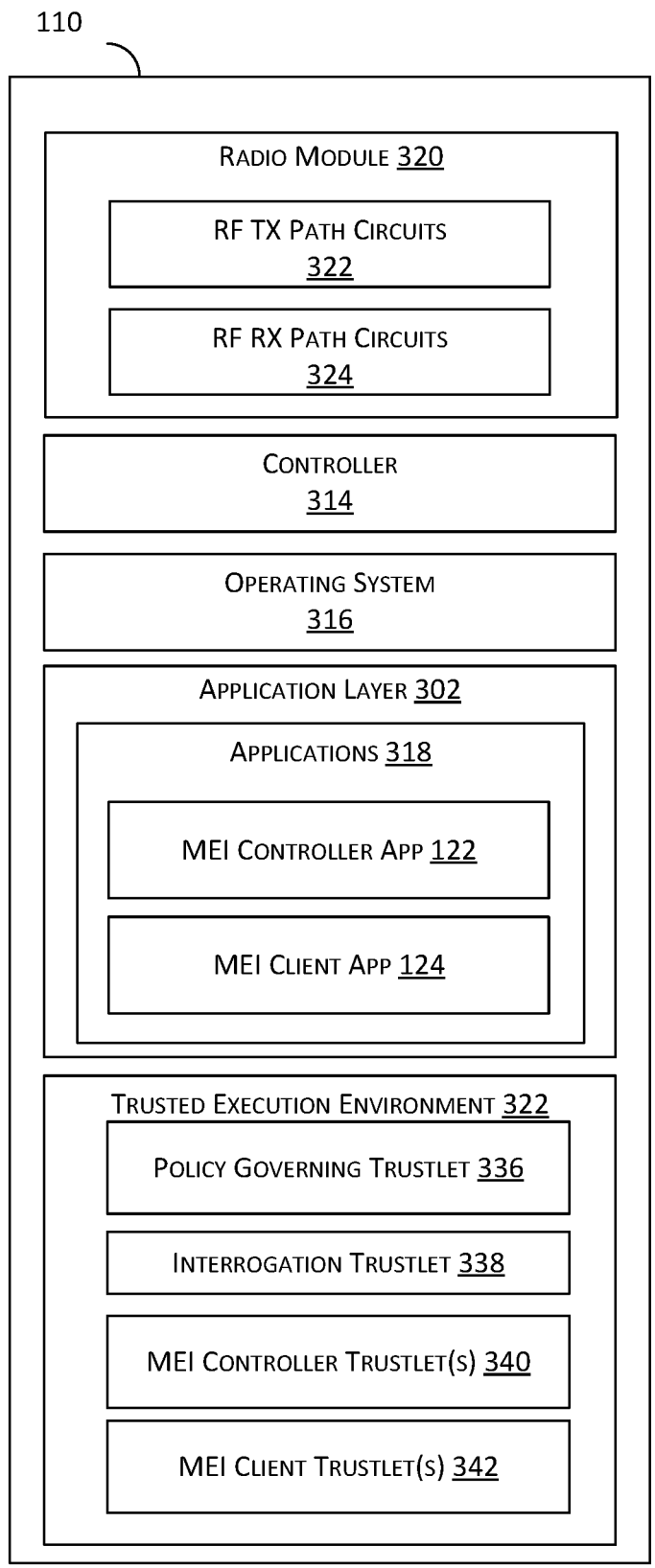
FIG. 3 is a diagram illustrating an example controller user equipment comprising an MEI controller application, in accordance with some embodiments described herein.

With reference now to FIG. 3, FIG. 3 illustrates an example UE 110, more specifically a UE 110 that may utilize mobility edge services of an operator core network such as operator core network 106. In some embodiments, the UE 110 may implement a primary UE 112 and comprise an MEI controller application 122. In some embodiments, the UE 110 may implement a secondary UE 114 and comprise a MEI client application 124. In some embodiments, a UE 110 may be configurable to switch between operating as a primary UE 112 and secondary UE 114 with respect to mobility edge services and thus comprise both an MEI controller application 122 and a MEI client application 124.

Although some UEs may include other components, generally UE 110 includes at least one radio module 320 that includes one or more RF transmit (TX) path 322 circuits, one or more RF receive (RX) path 324 circuits, and a controller 314. Configuration of the RF TX path 322 and/or RF RX path 324 may be controlled by the radio module 320, for example based on commands from the operating system 316 or other applications executed on the controller 314 (such as MEI controller application 122 and/or MEI client Application 124). In some embodiments one or both of the TX path circuits 322 and/or RF RX path 324 may comprise a plurality of RF paths, each corresponding to different frequency bands. In some embodiments where the UE 110 implements a primary UE 112, the at least one radio module 320 may configure the TX path circuits 322 and/or RF RX path 324 to implement a 3GPP or non-3GPP mobility edge RAN 116 based on instructions from the MEI controller application 122, and/or establish a connection with the RAN(s) 104. In some embodiments where the UE 110 implements a secondary UE 114, the at least one radio module 320 may configure the TX path circuits 322 and/or RF RX path 324 to access the mobility edge RAN 116 (using either 3GPP or non-3GPP communication links) based on instructions from the MEI client application 124, and/or establish a connection with the RAN(s) 104.

In the embodiment shown in FIG. 3, the UE 110 includes operating system 316 and one or more executable applications 318 that are executed by the controller 314 to implement the one or more functions of the primary UE 112 and/or secondary UE 114 described herein.

Generally a UE 110 includes at least an application layer 302 and may include a trusted execution environment (TEE) 322. The application layer 302 facilitates execution of the UE 110 operating system 316 and executables (including MEI controller application 122 and/or MEI client Application 124). In other words, the application layer 302 provides the direct user interaction environment for the UE 110. TEE 322 facilitates a secure area of the processor(s) of UE 110. That is, TEE 322 provides an environment in the UE 110 where isolated execution and confidentiality features are enforced. Example TEEs that may be used for UE 110 include, but are not limited to, Arm TrustZone technology, Software Guard Extensions (SGX) technology, Reduced Instruction Set Computer-Five (RISC-V), or similar technologies. For example, the application layer 302 may comprise the MEI controller application 122 and/or MEI client Application 124. In this embodiment, an application layer 302 facilitates execution of the UE operating system 316 and applications 318, which may include, but are not limited to, MEI controller application 122 and/or MEI client Application 124 and other applications that initiate tasks and perform transactions with respect to the function group 118.

As previously discussed, the MEI controller application 122 may include software code that when executed by the controller 314 performs the functions of the MEI controller application 122 described herein. For example, the MEI controller application 122 may include at least one function to control the radio module 320 to launch (e.g., generate) a bidirectional mobility edge radio access network 116 that supports both uplink and downlink communications with a secondary UE 114. The MEI controller application 122 may therefore include code to implement one or more 3GPP and/or non-3GPP air interface protocols to establish one or more communications links with the secondary UE 114. The MEI controller application 122 may include at least one function to implement the mobility edge interface 119, mobility UPF instance 260, and/or mobility N3IWF instance 270. The MEI controller application 122 may be programmed to receive key, credentials, or other code from the MEI manager 108 to locally launch these, or other, network functions in order to host these functions within the mobility edge interface 119 at the primary UE 112. The MEI controller application 122 may include at least one function to direct the data flow of user plane data for at least one data session established between the primary UE 112 and the secondary UE 114 through the mobility UPF instance 260. For example, the primary UE 112 may comprise one or more applications that establish data sessions (and exchange data) with one or more applications of the secondary UE 114. The MEI controller application 122 may configure the data paths within the UE 112 to direct traffic associated with those data sessions through the mobility UPF instance 260 rather than through the RAN(s) 104 and operator core network 106. As further described below, the MEI controller application 122 may perform one or more of these functions using trusted application (e.g., trustlets). In some embodiments, the MEI controller application 122 may be an individual application or process executed by the primary UE 112 that implements the mobility edge related functionality discussed herein. In other embodiments, the MEI controller application 122 may be integrated with other functionalities executed on the UE. For example, the MEI controller application 122 may be implemented as a module of the UE operating system 316. In other embodiments, the MEI controller application 122 may be integrated as a component within another application 318 that utilizes mobility edge functionalities. For example, in the scenario of the primary UE 112 functioning as the controller for a drone secondary UE 114, the primary UE 112 may execute a drone controller application (e.g., a Ground Control System (GCS)) where the functionalities of MEI controller application 122 are integrated in that drone controller application.

As previously discussed, the MEI client application 124 may include software code that when executed by the controller 314 performs the functions of the MEI client application 124 described herein. For example, the MEI client application 124 may include at least one function to control the radio module 320 to establish a communication link with the bidirectional mobility edge radio access network 116. In some embodiments, the MEI client application 124 may receive a credential from the MEI manager 108 that it uses to obtain access to the mobility edge radio access network 116, mobility UPF instance 260, and/or the mobility N3IWF instance 270. The MEI client application 124 may include code to implement one or more 3GPP and/or non-3GPP air interface protocols to establish the one or more communications links with the primary UE 112. The MEI client application 124 may include at least one function to direct the data flow of user plane data for at least one data session established between the primary UE 112 and the secondary UE 114 through the mobility UPF instance 260. For example, the primary UE 112 may comprise one or more applications that establish data sessions (and exchange data) with one or more applications of the secondary UE 112. The MEI client application 124 may configure the data paths within the UE 114 to direct traffic associated with those data sessions through the mobility UPF instance 260 rather than through the RAN(s) 104 and operator core network 106. As further described below, the MEI client application 124 may perform one or more of these functions using trusted application (e.g., trustlets). In some embodiments, the MEI client application 124 may be an individual application or process executed by the secondary UE 114 that implements the mobility edge related functionality discussed herein. In other embodiments, the MEI client application 124 may be integrated with other functionalities executed on the UE. For example, the MEI client application 124 may be implemented as a module of the UE operating system 316. In other embodiments, the MEI client application 124 may be integrated as a component within another application 318 that utilizes mobility edge functionalities. For example, in the scenario of the primary UE 112 functioning as the controller for a drone secondary UE 114, the secondary UE 112 may execute a drone responder application (e.g., an application that control the drone based on commands from a Ground Control System (GCS)) where the functionalities of MEI client application 124 are integrated in that drone responder application.

In some embodiments, application layer 302 may include applications executed in a rich environment and/or applications executed in the TEE 322. The MEI controller application 122 and/or MEI client Application 124 may be implemented at least in part by trustlets resident on the UE 110, protected from tempering or manipulation by a hardware Root of Trust and hosted from the TEE 322. Generally, computer readable code executed in the TEE 322 is referred to as a "trustlet". A trustlet can securely access data stored in memory of the UE 110 that is otherwise inaccessible by the application layer 302. A trustlet may take the form of trusted processes, secure processes, isolated user mode (IUM) processes, or the like. For example, a trustlet executed in TEE 322 can access system level data (that is, data related to the larger machine the UE 110 in incorporated within), private and/or public keys, and similar data stored, or accessed, by the UE 110. Trustlets can be activated in response to various network or UE operations. A trustlet can be activated by execution of an associated application in the application layer 302. For another example, a trustlet can be activated in response to a command generated by a network (e.g., network operator core 106 of FIG. 1) and communicated to the UE 110. For example, a trustlet may be activated in response to commands from the MEI manager 108. The trustlet(s) activation may vary depending on the service requested. For example, a first trustlet may be activated in response to a voice service. A second trustlet may be activated in response to a messaging service. A third trustlet may be activated in response to a data service that facilitates a telemetry update.

Upon activation, a trustlet performs a set of predetermined operations. The operations can include, but are not limited to: accessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations of other applications executed by the UE; writing data to the memory of UE; activate another trustlet; or any combination thereof.

In some embodiments, the trustlet(s) activation may vary within a particular type of service. For example, a fourth trustlet may be activated to support mobility edge service functions. Specifically with respect to mobile edge services, the MEI controller application 122 may activate one or more MEI controller trustlets 340 that communicate with the MEI manager 108 and receive authorization from the MEI manager 108 to launch the mobility edge interface 119, mobility UPF instance 260 and/or mobility N3IWF instance 270, and/or control the radio module 320 to create the mobility edge RAN 116. In some embodiments, the MEI client application 124 may activate one or more MEI client trustlets 342 that communicate with the MEI manager 108 and receive authorization from the MEI manager 108 to access the mobility edge interface 119, mobility UPF instance 260 and/or mobility N3IWF instance 270, and/or control the radio module to connect with the mobility edge RAN 116.

As depicted in FIG. 3, the TEE 322 illustratively may include other trustlets including a policy governing trustlet 336 and/or an interrogation trustlet 338. In other embodiments, a TEE 322 may include a fewer or greater number of trustlets than shown in FIG. 3. Policy governing trustlet 336 corresponds to an illustrative example of computer readable code that is activated in response to execution of an application or operation. Upon activation, policy governing trustlet 336 may access a locally stored set of keys corresponding to the application and the UE's processor. Such keys may be utilized for establishing a secured communication links via the mobility edge interface 119 between the primary UE 112 and the secondary UE 114. Additionally, policy governing trustlet 336 may access a UE's unique device identifier (device ID). The policy governing trustlet 336 may communicate the accessed data to a communication network for analysis.

In some embodiments, the device ID for a UE (either a primary UE 112 and/or secondary UE 114) may comprise an International Mobile Equipment Identity (IMEI) identifier and/or a Mobile Equipment Identifier (MEID). The IMEI may be stored in a subscriber identity module (SIM) card or embedded SIM (eSIM) of the UE 110 and transmitted to the operator core network 106 as part of the process to authenticate the UE 110. In some embodiments, a device ID may comprise one or more elements of an integrated circuit card identifier (ICCID), a permanent equipment identifier (PEI), mobile subscriber international subscriber directory number (MSISDN), mobile subscription identification number (MSIN), International mobile subscriber identity (IMSI), mobile country codes (MCC), subscription permanent identifier (SUPI), mobile network codes (MNC), and/or other identifier(s). In some embodiments, the device ID may comprise one of more decentralized identifiers (DIDs), such as World Wide Web Consortium (W3C) DIDs for example. In some embodiments, a device ID comprises a DID that resolves to a DID document. The DID document may be stored at a data registry (e.g., a verifiable data registry). For example, a DID may include a Universal Resource Identifier (URI) that associates a UE 110 (as a DID subject) with a DID document. The DID may include, for example, cryptographic public keys that a UE 110 may use to authenticate itself with the operator core network 106, and prove its association with the DID (e.g., the device ID). In some embodiments, the device ID may be based on a self-sovereign identity (SSI) paradigm where the UE 110 may present its device ID to the operator core network 106, which may verify that the device ID was issued from a trusted issuer. In some embodiments, a device ID may comprise a combination of identifiers such as any of those described herein. The device ID may comprise a combination of hardware identifiers, network address identifiers, serial numbers, component identifiers (e.g., CPU IDs), and/or other identifiers such a as discussed herein. In some embodiment a device ID may be managed (using a Dapp, crypto wallet, or the like, for example) and verified using public-key cryptography in conjunction with a distributed ledger. For example, in some embodiment the device ID for a UE 110 may be generated by back-end blockchain ledger and downloaded to the UE 110.

Interrogation trustlet 338 corresponds to an illustrative example of computer readable code that is activated in response to a command from the communication network. An interrogation trustlet can be activated by a command that is generated in response to a determination that UE 110 is an unknown device or that the UE provided anomalous data for a requested network service. In response to activation, an interrogation trustlet 338 may activate other trustlets, access additional data, or perform any other trustlet operation. The interrogation trustlet 338 may communicate the accessed data to a network function of the operator core network 106. For example, interrogation trustlet 338 can be activated in response to a command that a network function 228 or server application from a server on data network 107 has requested data from one or more trustlets executed in the trusted execution environment 322.

Figure 4:
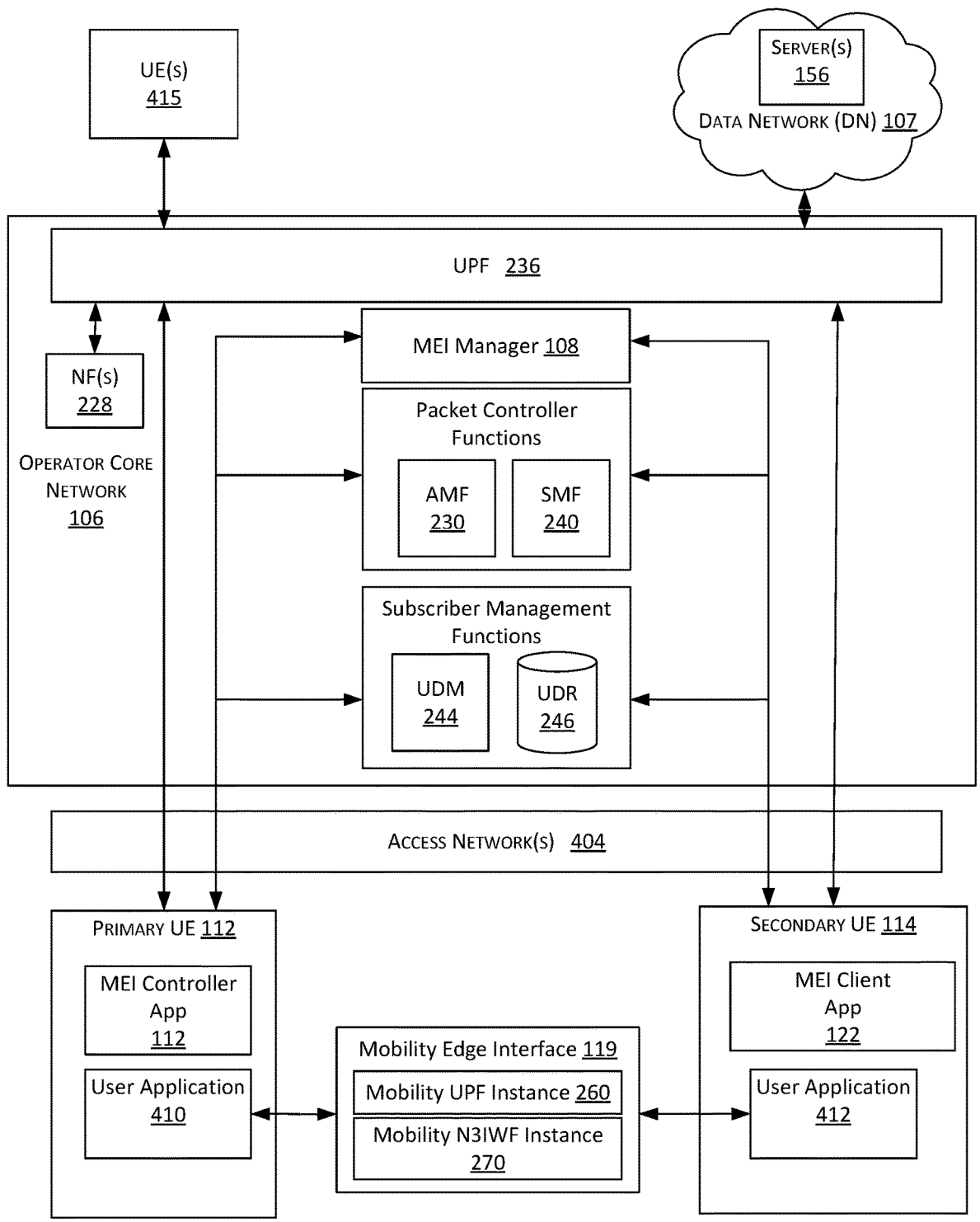
FIG. 4 is a diagram illustrating example data flow diagram for a mobility edge interface, in accordance with some embodiments described herein.

Referring now to FIG. 4, FIG. 4 is a diagram illustrating example data flow diagram for a mobility edge interface, in accordance with some embodiments described herein. As shown in FIG. 4, in some embodiments, each of the primary UE 112 and the secondary UE 114 may be in communication with an operator core network 106 via one or more access network(s) 404 (such as the radio access network(s) 104, for example). Within the operator core network 106, the primary UE 112 and the secondary UE 114 may be coupled to the UPF 236 and through the UPF 236, may communicate with one or more network functions 228, one or more elements of the data network 107 (such as servicer 156), and/or one or more other UE(s) 415. In this example, the primary UE 112 and secondary UE 114 form a function group (such as the functional group 118 shown in FIG. 1) to perform a task or service for which one or more data sessions are established between a first user application 410 executed by the primary UE 112 and a second user application 412 executed by the secondary UE 114. In this embodiment, the user data traffic for those one or more data sessions is transported between the primary UE 112 and the secondary UE 114 through the mobility edge interface 119 established by the MEI controller application 112 of the primary UE 112. As shown in FIG. 4 and discussed herein, the mobility edge interface 119 may comprise a mobility UPF instance 260 (hosted by the primary UE 112) that provides the data path to transport the user data traffic for the data session(s) between the first user application 410 and the second user application 412. In some embodiments, the mobility edge interface 119 may further comprise a mobility N3IWF instance 270 (hosted by the primary UE 112) to facilitate a non-3GPP communication link between the primary UE 112 and the secondary UE 114.

In some embodiments, the MEI manager 108 may receive a request message from the MEI controller application 112 to form the mobility edge interface (and the mobility UPF instance 260 and/or mobility N3IWF instance 270) to carry the data session between the between the first user application 410 and the second user application 412. The MEI manager 108 may confirm with the UDM 244 and/or UDR 246 that the primary UE 112 and secondary UE 114 are each subscribed to a network service (e.g., such as the mobility edge network service) to launch and/or use the mobility edge interface 119. The MEI manager 108 may confirm with the UDM that the primary UE 112 is authorized to host the mobility user plane function instance 260, and confirm with the UDM 244 and/or UDR 246 that the secondary UE 114 is authorized to access the mobility user plane function instance 260 launched and hosted by the primary UE 112. The MEI manager 108 may communicate with the AMF 230 to configure the MEI controller application 122 and/or MEI client application 124 to route traffic for one or more data sessions between the primary UE 112 and the secondary UE 114 through the mobility UPF instance 260 rather than through the UPF 236. In some embodiments, the MEI manager 108 may communicate with the SMF 240 to configure the MEI controller application 122 and/or MEI client application 124 to route traffic for one or more data sessions between the primary UE 112 and the secondary UE 114 through the mobility UPF instance 260 and mobility N3IWF instance 270 rather than through the UPF 236 and N3IWF 238.

Figure 5:
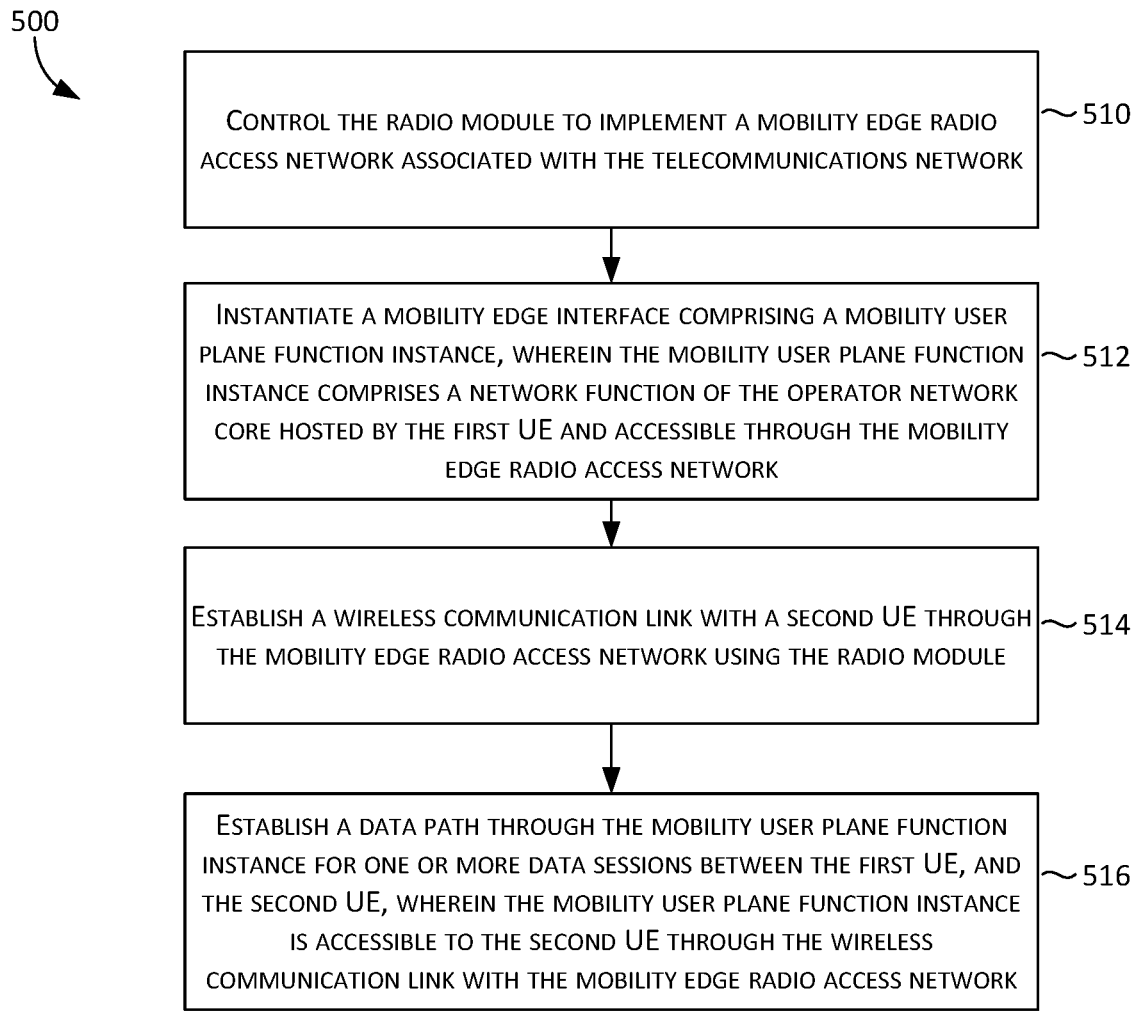
FIG. 5 is a flow chart illustrating an example method for a mobility edge interface for a telecommunications network, in accordance with some embodiments described herein.

FIG. 5 is a flow chart illustrating a method 500 for a mobility edge interface for a telecommunications network, according to some embodiments. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figured and/or embodiments described herein and vice versa. In some embodiments, elements of method 500 are implemented utilizing one or more processing units of a UE 110 as disclosed in any of the embodiments herein.

The method 500 at 510 includes controlling a radio module to implement a mobility edge radio access network associated with the telecommunications network. In some embodiments, the method includes obtaining authorization from an operator core network of a telecommunications network to instantiate the mobility edge interface comprising the mobility user plane function instance. In some embodiments, a first UE (e.g., a primary UE 112) may communicate at least one request message to the MEI manager network function of the operator core network. In some embodiments, the request message(s) may include an identifier of a second UE (e.g., the secondary UE 114). One or more processors of the first UE may execute code to instantiate the mobility edge interface comprising the mobility user plane function instance in response to receiving a grant message from the MEI manager function.

The method 500 at 512 includes instantiating a mobility edge interface comprising a mobility user plane function instance, wherein the mobility user plane function instance comprises a network function of the operator core network hosted by the first UE and accessible through the mobility edge radio access network. In some embodiments, the first UE may execute at least one trustlet in a trusted execution environment to instantiate the mobility edge interface comprising the mobility user plane function instance.

The method 500 at 514 includes establishing a wireless communication link with a second UE through the mobility edge radio access network using the radio module. The wireless communication link may comprise a point-to-point link between the first UE and the second UE. In some embodiments, the wireless communication link may be established using either a 3GPP technology or a non-3GPP technology. When the wireless communication link is a non-3GPP technology communication link, the first UE may further instantiate a mobility non-3GPP Interworking Function (N3IWF) instance in communication with the mobility user plane function instance within the mobility edge interface.

The method 500 at 516 includes establishing a data path through the mobility user plane function instance for a data session between the first UE, and the second UE. The mobility user plane function instance may be accessible to the second UE through the wireless communication link with the mobility edge radio access network. In some embodiments, the method further establishes a data path through the mobility user plane function instance for the one or more data sessions between a first application executing on the first UE, and a second application executing on the second UE. Once the data path is established, the method may include communicating one or more data sessions between a first application executing on the first UE, and a second application executing on the second UE. While user data may be transported by the mobility UPF instance, in some embodiments, control plane data for the mobility edge interface is communicated with the operator core network using via the radio access network 104. In some embodiments, the second UE may be granted access to the mobility user plane function instance based on a credential provided to the second UE by the operator core network.

Figure 6:
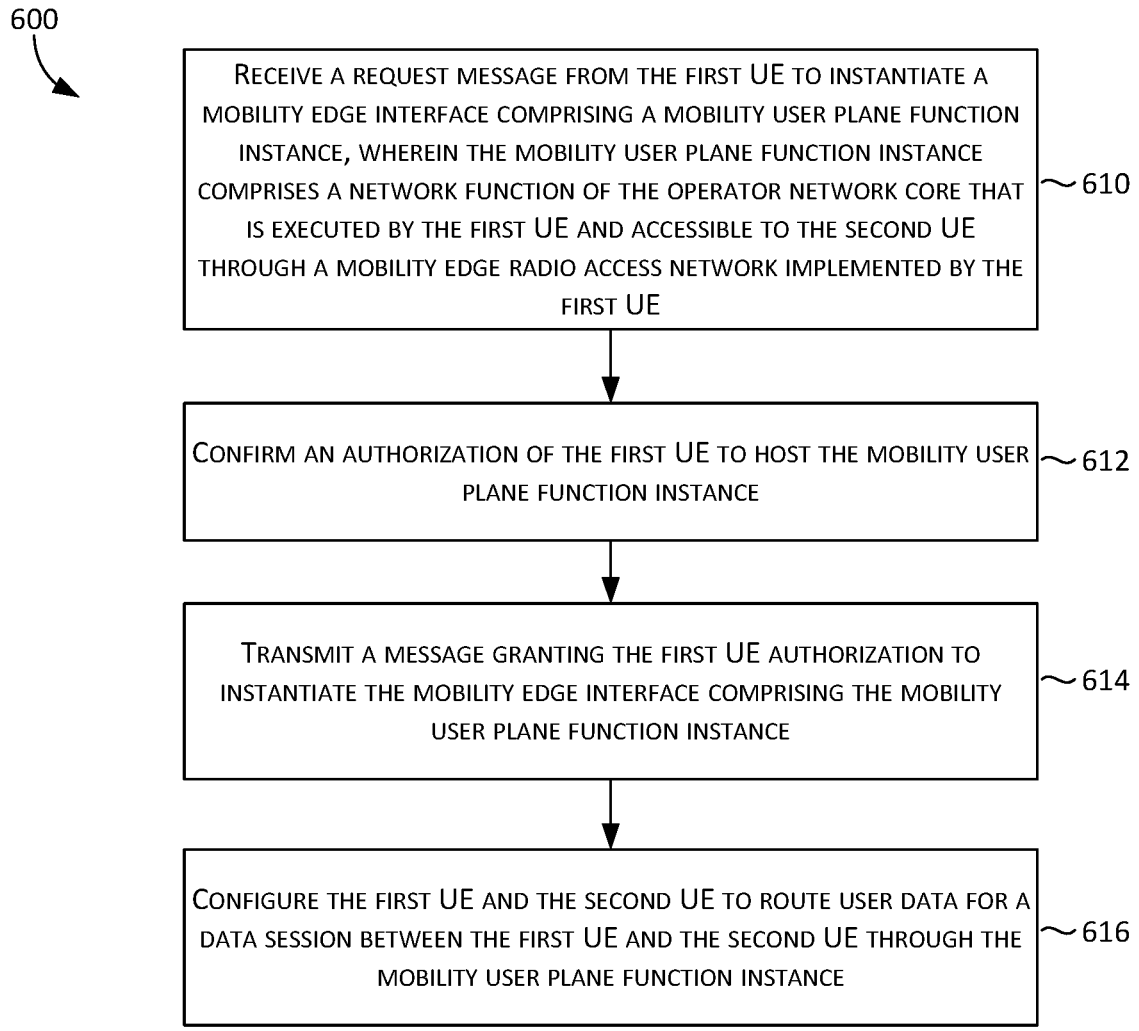
FIG. 6 is a flow chart illustrating an example method for a mobility edge interface for a telecommunications network, in accordance with some embodiments described herein.

FIG. 6 is a flow chart illustrating a method 600 for a mobility edge interface for a telecommunications network, according to some embodiments. It should be understood that the features and elements described herein with respect to the method of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa. In some embodiments, elements of method 500 are implemented utilizing one or more processing units of the operator core network 106, as disclosed in any of the embodiments herein.

The method 600 at 610 includes receiving a request message from the first UE to instantiate a mobility edge interface comprising a mobility user plane function instance. The mobility user plane function instance may comprise a network function of the operator core network that is executed by the first UE and accessible to the second UE through a wireless communication link with the mobility edge radio access network implemented by the first UE. The method 600 at 612 includes confirming an authorization of the first UE to host the mobility user plane function instance. For example, in some embodiments, the MEI manager 108 may confirm with the UDM 244 that the first UE is subscribed to a network service (e.g., such as the mobility edge network service) to determine when the first UE is authorized to host the mobility user plane function instance. In some embodiments, the MEI manager 108 may confirm with the UDM 244 that the second UE is subscribed to a network service (e.g., such as the mobility edge network service) to determine if the second UE is authorized to access the mobility user plane function instance launched and hosted by the first UE.

The method 600 at 614 includes transmit a message granting the first UE authorization to instantiate the mobility edge interface comprising the mobility user plane function instance. The method may further transmit a credential to the second UE to access the mobility user plane function through the mobility edge radio access network. The method 600 at 616 includes configure the first UE and the second UE to route user data for a data session between the first UE and the second UE through the mobility user plane function instance. In some embodiments, the MEI controller application 122 may include at least one function that may be configured by the MEI manager 108 to direct the data flow of user plane data for at least one data session established between the first UE and the second UE through the mobility UPF instance. For example, the first UE may comprise one or more applications that establish data sessions (and exchange data) with one or more applications of the second. The MEI controller application 122 may configure the data paths within the first UE to direct traffic associated with those data sessions through the mobility UPF instance rather than through the RAN(s) 104 and operator core network 106. Similarly, in some embodiments, the MEI client application may be configured by the MEI manager 108 to direct the data flow of user plane data for at least one data session established between the first UE and the second UE through the mobility UPF instance. For example, the first UE may comprise one or more applications that establish data sessions (and exchange data) with one or more applications of the second UE. The MEI client application may configure the data paths within the second UE to direct traffic associated with those data sessions through the mobility UPF instance rather than through the RAN(s) 104 and operator core network 106. Once the data path is established, one or more data sessions may be communicated between a first application executing on the first UE, and a second application executing on the second UE. In some embodiments, the second UE may be granted access to the mobility user plane function instance based on the credentials provided to the second UE by the operator core network.

Figure 7:
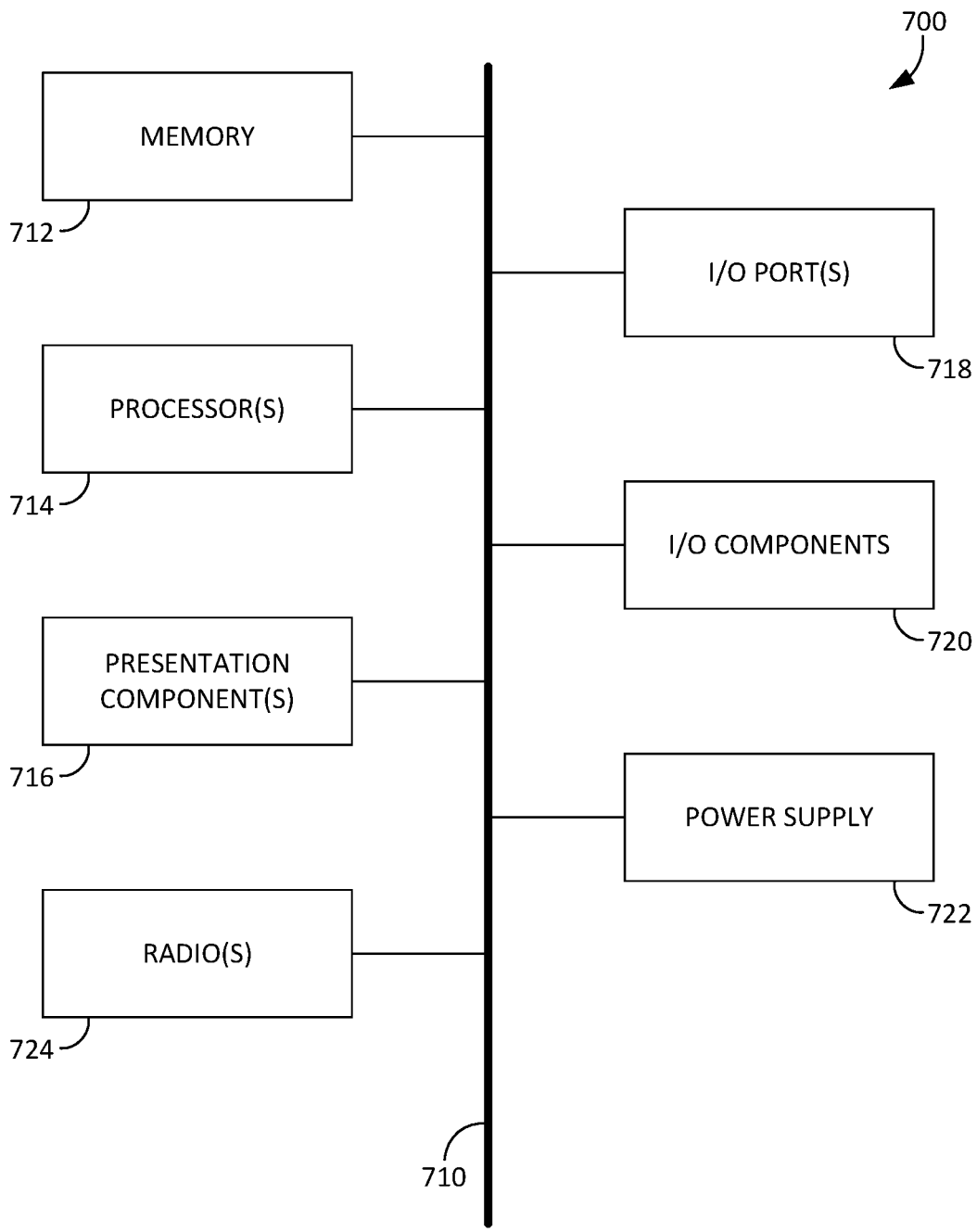
FIG. 7 is an example computing device, in accordance with some embodiments described herein.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the embodiments described herein. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 710 that directly or indirectly couples the following devices: memory 712, one or more processors 714, one or more presentation components 716, input/output (I/O) ports 718, I/O components 720, power supply 722, and radio 724. Bus 710 represents what may be one or more busses (such as an address bus, data bus, or combination thereof). The devices of FIG. 7 are shown with lines for the sake of clarity. However, it should be understood that the functions performed by one or more components of the computing device 700 may be combined or distributed amongst the various components. For example, a presentation component such as a display device may be one of I/O components 720. In some embodiments, the UE 110, such as a primary UE 112 or a secondary UE 114 of a functional group 116 may comprise a computing device 700. The processors of computing device 700, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device." In some embodiments, the MEI controller application 122, mobility edge interface 119, mobility UPF instance 260, mobility N3IWF instance 270, MEI client application 124, or other components and/or functions of a primary UE 112 and/or secondary UE 112, or other components as described in any of the examples of this disclosure, may be implemented at least in part by code executed by the one or more processors(s) 714 using memory 712.

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. Memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712 or I/O components 720. One or more presentation components 716 presents data indications to a person or other device. Exemplary one or more presentation components 716 include a display device, speaker, printing component, vibrating component, etc. I/O ports 718 allow computing device 700 to be logically coupled to other devices including I/O components 720, some of which may be built in computing device 700. Illustrative I/O components 720 include a microphone, joystick, game pad, satellite dish, scanner, printer, wireless device, etc.

Radio(s) 724 represents a radio that facilitates communication with a wireless telecommunications network. For example, radio(s) 724 may be used to establish communications with components of the RAN(s) 104 or mobility edge RAN 116, or used to establish the transmit and receive paths of the mobility edge RAN 116. Illustrative wireless telecommunications technologies include CDMA, GPRS, TDMA, GSM, 4G LTE, 3GPP 5G, and other 3GPP technologies. In some embodiments, the radio(s) 724 comprise circuits that implement the radio module 320 of a UE 110 as described herein. Radio(s) 724 may additionally or alternatively facilitate other types of non-3GPP wireless communications including Wi-Fi, WiMAX, and/or other VOIP communications. In some embodiments, radio(s) 724 may support multi-modal connections that include a combination of 3GPP radio technologies (e.g., 4G, 5G and/or 6G) and/or non-3GPP radio technologies. As can be appreciated, in various embodiments, radio(s) 724 can be configured to support multiple technologies and/or multiple radios can be utilized to support multiple technologies. In some embodiments, the radio(s) 724 may support communicating with access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 8:
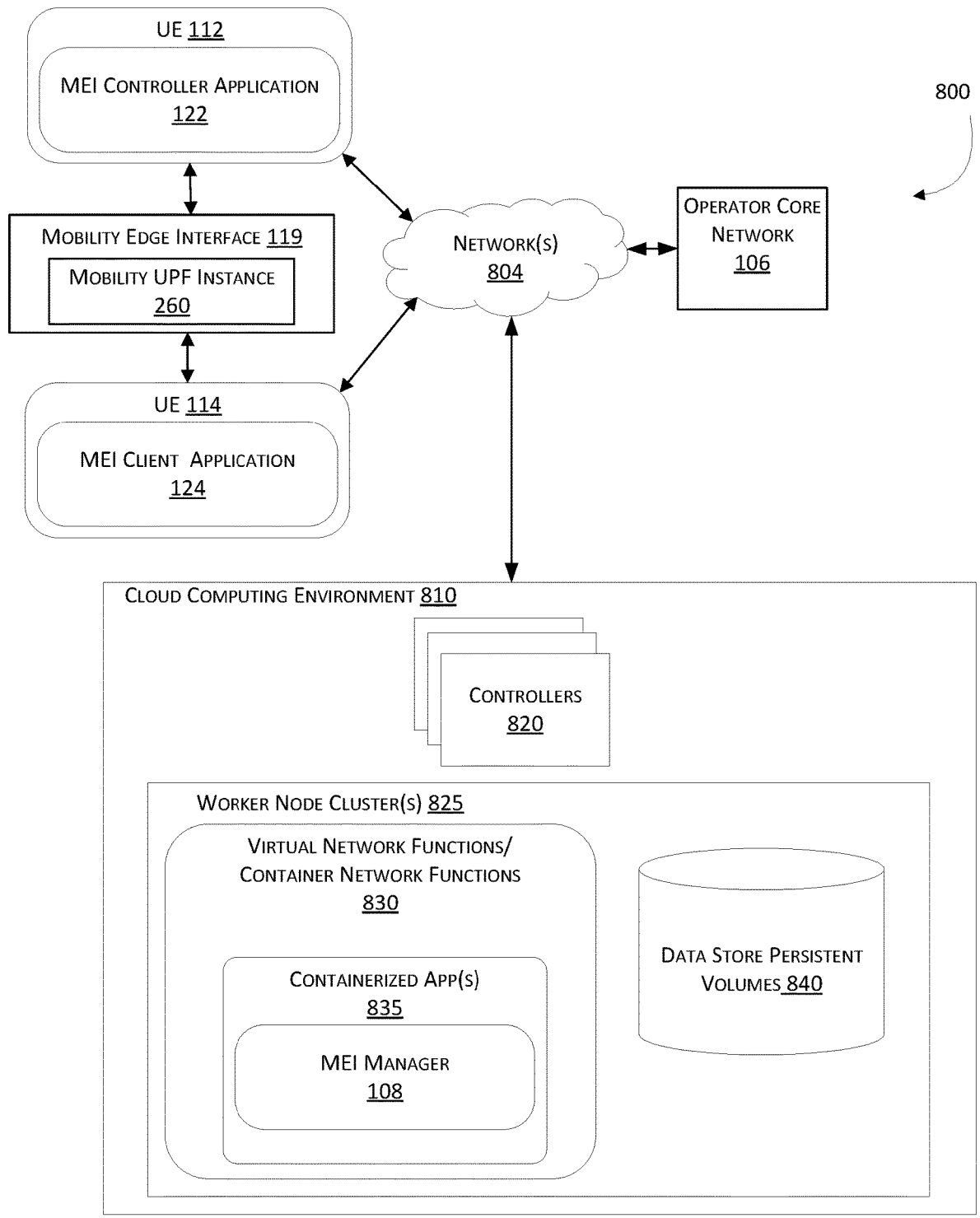
FIG. 8 is an example cloud computing platform, in accordance with some embodiments described herein.

Referring to FIG. 8, a diagram is depicted generally at 800 of an exemplary cloud computing environment 810 for implementing one or more aspects of mobility edge services, such as described herein. Cloud computing environment 810 is but one example of a suitable cloud-computing environment and is not intended to suggest any limitation as to the scope of use or functionality of the embodiments presented herein. Neither should cloud-computing environment 810 be interpreted as having any dependency or requirement relating to any one or combination of components illustrated. In some embodiments, the cloud-computing environment 810 is executed within operator core network 106, the core network edge 105, or otherwise coupled to the core network edge 105 or operator core network 106.

Cloud computing environment 810 includes one or more controllers 820 comprising one or more processors and memory. The cloud computing environment 810 may include one or more data store persistent volumes 840. The controllers 820 may comprise servers of one or more data centers. In some embodiments, the controllers 820 are programmed to execute code to implement at least one or more aspects of the MEI manager 108. For example, in one embodiment the MEI manager 108 may be implemented, at least in part, as one or more virtual network functions (VNFs)/container network functions (CNFs) 830 running on a worker node cluster 825 established by the controllers 820. The cluster of worker nodes 825 may include one or more orchestrated Kubernetes (K8s) pods that realize one or more containerized applications 835 for the MEI manager 108. In other embodiments, another orchestration system may be used to realize the MEI manager 108. For example the worker nodes 825 may use lightweight Kubernetes (K3s) pods, Docker Swarm instances, and/or other orchestration tools. In some embodiments, the UE 110 of a functional group 116 (e.g., one or more of primary UE 112 and/or secondary UE 114) may be coupled to the controllers 820 of the cloud-computing environment 810 by a network 804 (e.g., radio access network 104, operator core network 106, and/or data network 107).

In various alternative embodiments, system and/or device elements, method steps, or example implementations described throughout this disclosure (such as the UE, access networks, core network edge, operator core network, mobility edge RAN, mobility UPF instance, mobility N3IWF instance, MEI manager 108, MEI controller application, MEI client application, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for a mobility edge interface for a telecommunications network, the system comprising:
    a first user equipment (UE) comprising:
       a radio module comprising at least one radio frequency (RF) transmit path circuit and at least one RF receive path circuit, the radio module to establish communication between the first UE and an operator core network of a telecommunications network;
       one or more processors; and
       one or more computer-readable media storing computer-usable instructions that, when executed by the one or more processors, cause the one or more processors to:
          control the radio module to implement a mobility edge radio access network associated with the telecommunications network;
          instantiate a mobility edge interface comprising a mobility user plane function instance, wherein the mobility user plane function instance comprises a network function of the operator core network hosted by the first UE and accessible through the mobility edge radio access network;
          establish a wireless communication link with a second UE through the mobility edge radio access network using the radio module; and
          establish a data path through the mobility user plane function instance for one or more data sessions between the first UE, and the second UE, wherein the mobility user plane function instance is accessible to the second UE through the wireless communication link with the mobility edge radio access network.

2. The system of claim 1, wherein the wireless communication link is either a 3rd Generation Partnership Project (3GPP) technology communication link or a non-3GPP technology communication link.

3. The system of claim 2, wherein when the wireless communication link is the non-3GPP technology communication link, the one or more processors further instantiate a mobility non-3GPP Interworking Function (N3IWF) instance in communication with the mobility user plane function instance within the mobility edge interface.

4. The system of claim 1, the one or more processors further to:
   communicate at least one request message with a second network function of the operator core network, the at least one request message including an identifier of the second UE; and
   wherein the one or more processors instantiate the mobility edge interface comprising the mobility user plane function instance in response to a grant message received from the second network function.

5. The system of claim 1, the one or more processors further to:
   execute at least one trustlet in a trusted execution environment to instantiate the mobility edge interface comprising the mobility user plane function instance.

6. The system of claim 1, wherein the first UE communicates with the operator core network through a 3rd Generation Partnership Project (3GPP) radio access network.

7. The system of claim 6, the one or more processors further to:
   communicate control plane data for the mobility edge interface using the 3GPP radio access network.

8. The system of claim 6, the one or more processors further to:
   establish the data path through the mobility user plane function instance for the one or more data sessions between a first application executing on the first UE, and a second application executing on the second UE.

9. The system of claim 1, wherein the wireless communication link comprises a point-to-point link between the first UE and the second UE.

10. The system of claim 1, the one or more processors further to:
    grant the second UE access to the mobility user plane function instance based on a credential provided to the second UE by the operator core network.

11. The system of claim 1 wherein either:
    the first UE is associated with a vehicle and the second UE is associated with an aerial drone; or
    the first UE is associated with the aerial drone and the second UE is associated with the vehicle.

12. A telecommunications network, the network comprising:
    an operator core network, wherein a first user equipment (UE) and a second UE communicate with the operator core network through at least one access network; and
    one or more processing units to:
       receive a request message from the first UE to instantiate a mobility edge interface comprising a mobility user plane function instance, wherein the mobility user plane function instance comprises a network function of the operator core network that is executed by the first UE and accessible to the second UE through a mobility edge radio access network implemented by the first UE;
       confirm an authorization of the first UE to host the mobility user plane function instance;
       transmit a message granting the first UE authorization to instantiate the mobility edge interface comprising the mobility user plane function instance; and
       configure the first UE and the second UE to route user data for a data session between the first UE and the second UE through the mobility user plane function instance.

13. The network of claim 12, the one or more processing units further to:
    transmit a credential to the second UE to access the mobility user plane function instance through the mobility edge radio access network.

14. The network of claim 12, the one or more processing units further to:
    confirm the authorization of the first UE to host the mobility user plane function instance based on confirming a subscription of the first UE to a service.

15. The network of claim 12, the one or more processing units further to:
    establish an interface between a user plane function executed by the operator core network and the mobility user plane function instance.

16. A method for a mobility edge interface for a telecommunications network, the method comprising:
- obtaining authorization from an operator core network of a telecommunications network to instantiate a mobility edge interface comprising a mobility user plane function instance, wherein the mobility user plane function instance comprises a network function of the operator core network;
- control a radio module of a first UE to implement a mobility edge radio access network associated with the telecommunications network;
- establish a point-to-point wireless communication link between the first UE and a second UE through the mobility edge radio access network;
- instantiate the mobility edge interface comprising the mobility user plane function instance; and
- establish a data path through the mobility user plane function instance for a data session between the first UE, and the second UE, wherein the mobility user plane function instance is accessible to the second UE through the point-to-point wireless communication link with the mobility edge radio access network.

17. The method of claim 16, wherein the point-to-point wireless communication link is either a 3rd Generation Partnership Project (3GPP) technology communication link or a non-3GPP technology communication link.

18. The method of claim 17, wherein when the point-to-point wireless communication link is a non-3GPP technology communication link, the method further comprises:
- instantiating a mobility non-3GPP Interworking Function (N3IWF) instance in communication with the mobility user plane function instance within the mobility edge interface.

19. The method of claim 16, the method further comprising:
- communicating at least one request message with a second network function of the operator core network; and
- instantiating the mobility edge interface comprising the mobility user plane function instance in response to a grant message received from the second network function.

20. The method of claim 16, the method further comprising:
- granting the second UE access to the mobility user plane function instance based on a credential provided to the second UE by the operator core network.

* * * * *